(12) United States Patent
Wang et al.

(10) Patent No.: US 9,456,374 B2
(45) Date of Patent: *Sep. 27, 2016

(54) METHOD OF ANONYMOUSLY REPORTING MINIMIZATION OF DRIVE TEST MEASUREMENTS

(71) Applicant: Samsung Electronics Co., Ltd., Gyeonggi-do (KR)

(72) Inventors: Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,722

(22) Filed: Oct. 6, 2015

(65) Prior Publication Data

US 2016/0029241 A1     Jan. 28, 2016

Related U.S. Application Data

(63) Continuation of application No. 14/819,136, filed on Aug. 5, 2015, which is a continuation of application No. 14/348,861, filed as application No. PCT/KR2012/007966 on Sep. 28, 2012, now Pat. No. 9,119,108.

(30) Foreign Application Priority Data

Sep. 29, 2011   (CN) ........................... 2011 1 0304850
Nov. 10, 2011   (CN) ........................... 2011 1 0379620

(51) Int. Cl.
   *H04W 24/10*     (2009.01)
   *H04W 12/02*     (2009.01)
   *H04W 24/06*     (2009.01)

(52) U.S. Cl.
   CPC ............. *H04W 24/10* (2013.01); *H04W 12/02* (2013.01); *H04W 24/06* (2013.01)

(58) Field of Classification Search
   CPC ..... H04W 92/02; H04W 88/06; H04W 4/02; H04W 88/02; H04W 24/10; H04W 24/06; H04W 12/02
   USPC ................. 455/67.11–67.16, 422.1–425, 561
   See application file for complete search history.

(56) References Cited

U.S. PATENT DOCUMENTS 7,680,500 B2 *   3/2010   Tiedemann, Jr. ..... H04W 16/00
                                                       370/331
8,442,547 B2 *   5/2013   Ahluwalia ........... H04W 36/22
                                                       455/450

(Continued)

FOREIGN PATENT DOCUMENTS

EP      2597904 A1       5/2013
WO   WO 2011/093666 A3   8/2011

OTHER PUBLICATIONS

Extended European Search Report dated Sep. 7, 2015 in connection with European Application 12834781.2; 6 pages.

(Continued)

*Primary Examiner* — Sharad Rampuria

(57) ABSTRACT

The present invention provides a method of anonymously reporting minimization of drive test (MDT) measurements. According to the method, a mobility management entity (MME) obtains MDT data anonymity configuration which indicates whether MDT measurements are to be reported anonymously at a type allocation code (TAC) level; sends a TAC of a UE to a trace collection entity (TCE) if the MDT data anonymity configuration indicates MDT measurements are to be reported anonymously at the TAC level; sends an international mobile subscriber identification (IMSI) or an international mobile equipment identity and software version (IMEISV) of the UE to the TCE if the MDT data anonymity configuration indicates other information, e.g. Trace, is adopted for anonymously reporting MDT measurements. The present invention enables an MME to send different identities of a UE to the TCE according to different requirements for anonymity to implement anonymous reporting of MDT measurements.

8 Claims, 3 Drawing Sheets

(56) References Cited

U.S. PATENT DOCUMENTS

| | | | |
|---|---|---|---|
| 2011/0183662 A1 | 7/2011 | Lee et al. | |
| 2011/0319115 A1* | 12/2011 | Racz | H04W 24/10 455/514 |
| 2012/0039240 A1* | 2/2012 | Han | H04B 7/155 370/315 |
| 2013/0084888 A1* | 4/2013 | Johansson | H04W 24/08 455/456.1 |
| 2013/0114446 A1* | 5/2013 | Liu | H04W 24/10 370/252 |
| 2014/0113656 A1* | 4/2014 | Schmidt | H04W 24/10 455/456.2 |
| 2014/0194109 A1* | 7/2014 | Nunzi | H04W 24/08 455/418 |
| 2014/0357297 A1* | 12/2014 | Futaki | H04W 24/10 455/456.1 |
| 2015/0092579 A1 | 4/2015 | Li et al. | |
| 2015/0208197 A1 | 7/2015 | Keskitalo et al. | |
| 2015/0289157 A1 | 10/2015 | Lundqvist et al. | |
| 2015/0341838 A1 | 11/2015 | Pinheiro et al. | |
| 2015/0350892 A1* | 12/2015 | Johansson | H04L 63/0407 455/411 |
| 2016/0014630 A1* | 1/2016 | Xu | H04W 24/02 370/252 |
| 2016/0036710 A1* | 2/2016 | Hanaoka | H04L 47/2466 370/235 |

OTHER PUBLICATIONS

3GPP TS 32.422 v11.1.0, "3rd Generation Partnership Project; Technical Specification Group Services and System Aspects; Telecommunication management; Subscriber and equipment trace; Trace control and configuration management (Release 11)", Sep. 26, 2011, 117 pages.

International Search Report dated Mar. 11, 2013 in connection with International Patent Application No. PCT/KR2012/007966, 3 pages.

Written Opinion of International Searching Authority dated Mar. 11, 2013 in connection with International Patent Application No. PCT/KR2012/007966, 4 pages.

3GPP TS 32.422 v10.4.0, "3rd Generation Partnership Project; Technical Specification Group Services and System Aspects; Telecommunication management; Subscriber and equipment trace; Trace control and configuration management (Release 10)", Jun. 18, 2011, 115 pages.

3GPP TS 37.320 v10.2.0, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", Jun. 30, 2011, 17 pages.

First Action Interview Pilot Program Pre-Interview Communication dated Mar. 24, 2016 in connection with U.S. Appl. No. 14/876,769, 9 pages.

\* cited by examiner

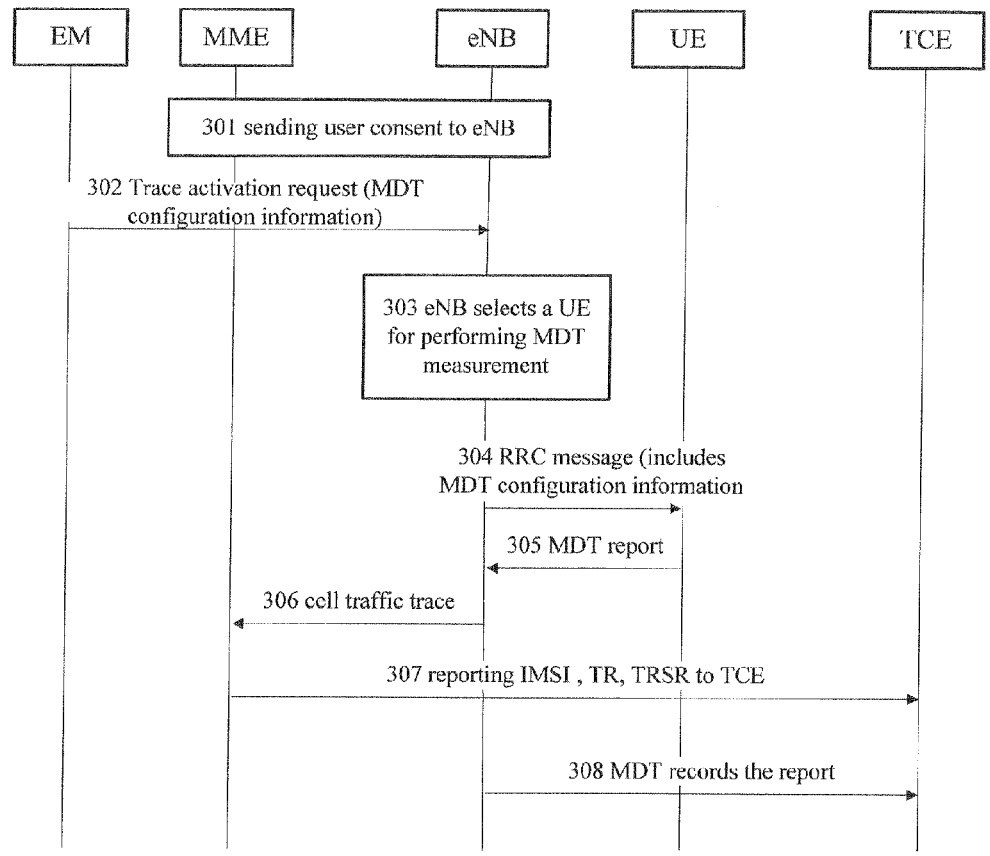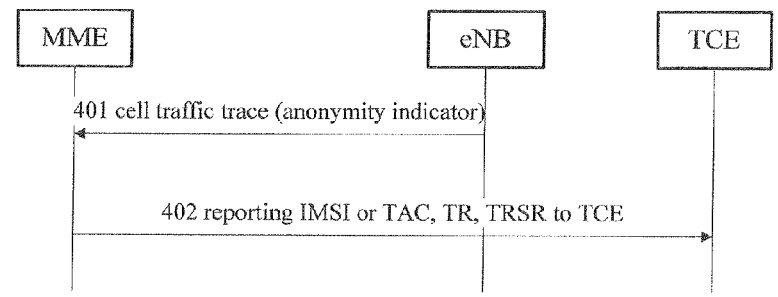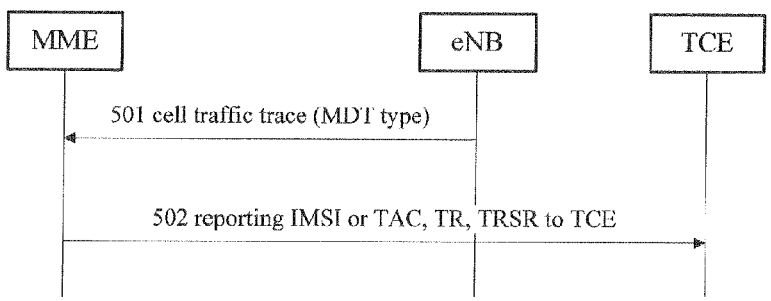

METHOD OF ANONYMOUSLY REPORTING MINIMIZATION OF DRIVE TEST MEASUREMENTS

CROSS-REFERENCE TO RELATED APPLICATIONS AND CLAIM OF PRIORITY

The present application is a continuation of U.S. patent application Ser. No. 14/819,136 filed Aug. 5, 2015, which is a continuation of U.S. patent application Ser. No. 14/348, 861 filed Mar. 31, 2014, which is related to and claims priority under 35 U.S.C. §365 to International Patent Application No. PCT/KR2012/007966 filed Sep. 28, 2012 entitled "METHOD OF ANONYMOUSLY REPORTING MINIMIZATION OF DRIVE TEST MEASUREMENTS" and, through International Patent Application No. PCT/KR2012/007966, to Chinese Patent Application No. 201110304850.7 filed Sep. 29, 2011 and Chinese Patent Application No. 201110379620.7 filed Nov. 10, 2011 which are incorporated herein by reference into the present disclosure as if fully set forth herein.

TECHNICAL FIELD

The present invention relates to wireless communications, and particularly, to a method of anonymously reporting minimization of drive test (MDT) measurements.

BACKGROUND ART

FIG. 1 is a schematic illustrating a system structure of a system architecture evolution (SAE). Wherein:

user equipment (UE) 101 is a terminal device for receiving data. Evolved universal terrestrial radio access network (E-UTRAN) 102 is a wireless access network which includes eNodeB/NodeB for providing UEs with interfaces for accessing the wireless network. Mobility management entity (MME) 103 is for managing mobility context, session context and security information of UEs. Serving gateway (SGW) 104 is mainly for providing user plain functions. MME 103 and SGW 104 may reside in the same physical entity. Packet data network (PDN) gateway (PGW) is for implementing functions including accounting, lawful interception and so on, and may reside in the same physical entity with SGW 104. Policy and charging rule functions (PCRF) 106 provides Quality of Service (QoS) policies and charging rules. Serving GPRS support node (SGSN) 108 is a network node device providing routing for data transmission in the Universal Mobile Telecommunications System (UMTS). Home Subscriber Server (HSS) 109 is a home sub system of UEs, is for maintaining user information including current location, the address of the serving node, user security information, packet data context of a UE.

Minimization of drive tests (MDT) is measurement information transmitted in the control plain for reducing workload of manual tests. MDT measurements include real time measurements and non-real time measurements. Configuration of the measurements is configured in an access network controlling system (E-UTRAN or UTRAN) by a network management system, and is sent by the access network controlling system to the UEs via an RRC message. The UE sends its MDT measurement results to the E-UTRAN/UTRAN. A measurement report may include location information and time information. The E-UTRAN/UTRAN sends the measurement results to an MDT entity in the core network.

MDT can be divided into management-based MDT and signaling-based MDT according to the manner in which the MDT is initiated. The management-based MDT refers to an MDT-activated message received by the E-UTRAN/UTRAN from a management entity, while the signaling-based MDT refers to an MDT-activated message received by the E-UTRAN/UTRAN from an MME.

FIG. 2 is a schematic illustrating a structure of a management-based MDT. In FIG. 2, 201 is an element management (EM) for sending a trace activation request to network element 202. The trace activation request may include MDT configuration information and a trace reference (TR).

Network element 202 selects a UE for performing MDT, allocates a trace record session reference (TRSR), and sends a message which includes MDT configuration information, the TR and the TRSR to UE 203.

UE 203 performs MDT according to the MDT configuration information, and sends measurement results to the network element via an MDT report when a reporting condition is satisfied.

The network element sends a message which includes the TR and the TRSR to the MME. The MME obtains the international mobile subscriber identification (IMSI) or the international mobile equipment identity and software version (IMEISV) of the UE, and sends the IMSI/IMEISV to a trace collection entity (TCE).

Network element 202 stores an MDT record, and sends the MDT record, the TR and the TRSR to TCE 204 according to a pre-defined policy.

The TCE identifies the UE of the MDT record based on information sent by the MME and information sent by the network element.

Initiation of the MDT makes use of a conventional Trace process, and is a special one of Trace functions. Taking the signaling process in the E-UTRAN as an example, FIG. 3 shows a flowchart of a signaling process of initiating a management-based MDT according to the prior art. In block 301, an MME sends an initial context establishing request which includes a user consent to the eNB in this block if a UE has established an RRC connection with an eNB in a conventional RRC establishing process before this block is performed; or the MME sends a handover request which includes a user consent to the eNB in this block if the UE has been handed over from a serving eNB to a target eNB before this block is performed. Subsequent handover process is the same with the conventional handover process, and will not be described further herein. The user consent indicates whether the UE is available for performing the MDT. The user consent belongs to subscription information of the UE, is stored in the HSS and is sent to the MME. After receiving the initial context establishing request or the handover request from the MME, the eNB stores the user consent if the request includes the user consent, and takes the user consent into consideration when selecting a UE for performing MDT. In block 302, the EM sends a Trace activation request to the eNB. The EM is a management element, and the Trace activation request may include MDT configuration information. The MDT configuration information may mainly include: MDT location selection condition, reporting scheme configuration, TR, the IP address of the TCE, a work mode and MDT data anonymity information and so on.

The work mode may be configured to be one of the following four modes: Immediate MDT only, Logged MDT only, Trace only and Immediate MDT and Trace. Wherein:

Immediate MDT only is a real time-type MDT, indicating the UE should perform MDT in a connection mode. Logged MDT only is a log-type MDT, indicating the UE obtains MDT configuration under the connection mode, performs MDT in the idle mode, and reports MDT measurement results when returning to the connection mode. Trace only indicates only tracing is performed, and is not a type of MDT. Immediate MDT and Trace refers to both real time MDT measurements and trace measurements are to be performed.

The MDT location selection condition defines locations of UEs which can be selected for performing MDT. The MDT location selection condition may be configured as a coverage area of a cell, or a coverage area of a Type Allocation Code (TAC), or a whole PLMN. UEs within the location range can be selected as UEs performing the MDT. A TR uniquely identifies an MDT process. In one MDT process, an eNB may select multiple users to perform the MDT.

In block 303, the eNB firstly selects UEs for performing the MDT after receiving the Trace activation request. When selecting UEs, the eNB needs to take the user consent sent by the MME and the location selection condition in the MDT configuration information into consideration. If the UE is not consent to performing MDT or if the UE does not meet the location selection condition, the UE can not be selected for performing MDT. After the UE is selected, the eNB allocates a TRSR to the UE, and sends the MDT configuration information to the UE. The configuration information may include: a location selection condition, a reporting scheme configuration, the TR, the TRSR, and an identifier of the IP address of the TCE. In block 304, after receiving the MDT configuration information, the UE starts MDT functions according to the MDT configuration.

In block 305, after performing the MDT, the UE sends a MDT measurement report to the eNB. In block 306, after receiving the MDT measurement report from the UE, the eNB obtains the TR, the TRSR, the identifier of the IP address of the TCE and the measurement results from the measurement report, obtains the IP address of the TCE based on the identifier of the IP address of the TCE, sends a cell traffic trace message to the MME, wherein the relation which associates the IP address of the TCE with the identifier of the IP address is stored in the eNB in advance, the cell traffic trace message includes the TR, the TRSR, a cell ID, and an S1 AP Id allocated for the UE by the eNB and the MME, and the IP address of the TCE. In block 307, after receiving the cell traffic trace message, the MME obtains context information of the UE, obtains the IMSI/IMEISV information, and sends to the TCE a message which includes the IMSI/IMEISV of the UE, the TR and the TRSR. In block 308, the eNB reports collected MDT measurements to the TCE.

In block 302, the MDT configuration information in the Trace activation request sent by the EM to the eNB may further include MDT data anonymity information. The MDT data anonymity information may be configured to be two anonymity levels, i.e., TAC-level anonymity and full anonymity. When TAC-level anonymity is configured, the MME is required not to send the IMSI/IMEISV to the TCE, but send the TAC information in the IMEI to the TCE instead. When full anonymity is configured, the eNB does not send the cell traffic trace to the MME, and the MME does not send any identification of the UE to the TCE.

DISCLOSURE OF INVENTION

Technical Problem

In view of the foregoing, the MDT makes use of the Trace process. As for Trace, when an MME receives a cell traffic trace, the MME needs to send the IMSI/IMEISV to the TCE. At present, the cell traffic trace message only includes the TR, the TRSR, the cell ID, S1 AP Id allocated by the eNB and the MME for the UE, and the IP address of the TCE. Based on the above information, the MME can not identify when to send the IMSI/IMEISV and when to send the TAC, thus anonymous reporting of MDT measurements can not be implemented.

Solution to Problem

The present invention provides a method of anonymously reporting MDT measurements so that the MME is able to send different identifications of a UE to the TCE according to different requirements for anonymity, therefore implements anonymous report of MDT measurements.

The method of anonymously reporting MDT measurements provided by an embodiment of the present invention may include:

obtaining, by a mobility management entity (MME), MDT data anonymity configuration which indicates whether a anonymization level of MDT data is a Type Allocation Code (TAC) level;

sending a TAC of a user equipment (UE) to a trace collection entity (TCE) if the MDT data anonymity configuration indicates the anonymization level of the MDT data is the TAC level; otherwise, sending an international mobile subscriber identification (IMSI) or an international mobile equipment identity and software version (IMEISV) of the UE to the TCE.

Preferably, the MDT data anonymity configuration comprises: an anonymity indicator.

Preferably, a function rule of the anonymity indicator comprises: at least two of loading the anonymity indicator into a message for indicating the MDT measurements are to be reported anonymously at the TAC level to make the MME send the TAC of the UE to the TCE; loading no anonymity indicator into the message for indicating MDT measurements are not to be reported anonymously to make the MME sends the IMSI or the IMEISV of the UE to the TCE; and loading an anonymity indicator indicating both identities are required into the message to make the MME send the TAC and the IMSI of the UE or the TAC and the IMEISV of the UE to the TCE.

Preferably, the MDT data anonymity configuration comprises: an MDT type.

Preferably, a function rule of the MDT type comprises:

loading an MDT type which value is Immediate MDT only or Logged MDT only into a message for indicating the MDT measurements are to be anonymously reported at the TAC level to make the MME send the TAC of the UE to the TCE;

loading an MDT type which value is Immediate MDT and Trace into a message; wherein when it is pre-configured that MDT has priority, the message indicates the MDT measurements are to be anonymously reported at the TAC level, and the MME sends the TAC of the UE to the TCE; when it is pre-configured that Trace has priority, the message indicates the MDT measurements are not reported anonymously, and the MME sends the IMSI or the IMEISV to the TCE; or the MME sends the TAC and the IMSI of the UE or the TAC and the IMEISV of the UE to the TCE;

loading no MDT type into the message for indicating the MDT measurements are not reported anonymously, and the MME sends the IMSI or the IMEISV to the TCE.

Preferably, the MDT data anonymity configuration comprises: MDT anonymity information and a work mode of the MDT measurement.

Preferably, a functioning rule of the MDT data anonymity configuration comprises:

loading MDT anonymity information and a work mode which is set to be Immediate MDT only or Logged MDT only into a message for indicating the MDT measurements are to be anonymously reported at the TAC level to make the MME send the TAC of the UE to the TCE;

loading the MDT anonymity information and a work mode which is set to be Immediate MDT and Trace into a message; wherein when it is pre-configured that MDT has priority, the message indicates the MDT measurements are to be anonymously reported at the TAC level, and the MME sends the TAC of the UE to the TCE; when it is pre-configured that Trace has priority, the message indicates the MDT measurements are not reported anonymously, and the MME sends the IMSI or the IMEISV to the TCE; or the MME sends the TAC and the IMSI of the UE or the TAC and the IMEISV of the UE to the TCE;

loading no MDT anonymity information or loading a work mode which is set to be Trace only into the message for indicating the MDT measurements are not reported anonymously, and the MME sends the IMSI or the IMEISV to the TCE.

Preferably, a functioning rule of the MDT data anonymity configuration comprises:

loading MDT anonymity information whose value indicates anonymity and a work mode which is set to be Immediate MDT only or Logged MDT only into a message for indicating the MDT measurements are to be anonymously reported at the TAC level to make the MME send the TAC of the UE to the TCE;

loading MDT anonymity information whose value indicates anonymity and a work mode which is set to be Immediate MDT and Trace into a message; wherein when it is pre-configured that MDT has priority, the message indicates the MDT measurements are to be anonymously reported at the TAC level, and the MME sends the TAC of the UE to the TCE; when it is pre-configured that Trace has priority, the message indicates the MDT measurements are not reported anonymously, and the MME sends the IMSI or the IMEISV to the TCE; or the MME sends the TAC and the IMSI of the UE or the TAC and the IMEISV of the UE to the TCE;

loading MDT anonymity information whose value indicates no anonymity or loading a work mode which is set to be Trace only into the message for indicating the MDT measurements are not reported anonymously, and the MME sends the IMSI or the IMEISV to the TCE.

Preferably, the MDT data anonymity configuration comprises: MDT anonymity information and an MDT type.

Preferably, a functioning rule of the MDT data anonymity configuration comprises:

loading MDT anonymity information and an MDT type which is set to be Immediate MDT only or Logged MDT only into a message for indicating the MDT measurements are to be anonymously reported at the TAC level to make the MME send the TAC of the UE to the TCE;

loading the MDT anonymity information and an MDT type which is set to be Immediate MDT and Trace into a message; wherein when it is pre-configured that MDT has priority, the message indicates the MDT measurements are to be anonymously reported at the TAC level, and the MME sends the TAC of the UE to the TCE; when it is pre-configured that Trace has priority, the message indicates the MDT measurements are not reported anonymously, and the MME sends the IMSI or the IMEISV to the TCE; or the MME sends the TAC and the IMSI of the UE or the TAC and the IMEISV of the UE to the TCE;

loading no MDT anonymity information into the message for indicating the MDT measurements are not reported anonymously.

Preferably, a functioning rule of the MDT data anonymity configuration comprises:

loading MDT anonymity information whose value indicates anonymity and an MDT type which is set to be Immediate MDT only or Logged MDT only into a message for indicating the MDT measurements are to be anonymously reported at the TAC level to make the MME send the TAC of the UE to the TCE;

loading the MDT anonymity information whose value indicates anonymity and an MDT type which is set to be Immediate MDT and Trace into a message; wherein when it is pre-configured that MDT has priority, the message indicates the MDT measurements are to be anonymously reported at the TAC level, and the MME sends the TAC of the UE to the TCE; when it is pre-configured that Trace has priority, the message indicates the MDT measurements are not reported anonymously, and the MME sends the IMSI or the IMEISV to the TCE; or the MME sends the TAC and the IMSI of the UE or the TAC and the IMEISV of the UE to the TCE;

loading MDT anonymity information whose value indicates no anonymity or loading an MDT type which is set to be Trace only into the message for indicating the MDT measurements are not reported anonymously, and the MME sends the IMSI or the IMEISV to the TCE.

Preferably, the MDT data anonymity configuration is obtained from a cell traffic trace message sent by a base station.

Preferably, the MDT data anonymity configuration is obtained from a message sent by an element management (EM), wherein the message further comprises a trace reference (TR).

Preferably, a functioning rule of the MDT data anonymity configuration comprises: determining the MDT measurements are to be reported anonymously at the TAC level when receiving a pre-configured MDT data anonymity indication message from an EM, the MME sending the TAC of the UE to the TCE; determining the MDT measurements are no to be reported anonymously when receiving no MDT data anonymity indication message from the EM, the MME sending the IMSI or the IMEISV of the UE to the TCE.

Preferably, the MDT data anonymity configuration comprises: a TR which is obtained from a message sent by an EM;

the method further comprises: obtaining, by the MME, a TR range within which anonymity is required from a message sent by an EM and/or a TR range within which anonymity is not required, wherein the TR range is defined by the EM;

a functioning rule of the MDT data anonymity configuration comprises: determining the MDT measurements are to be reported anonymously at the TAC level when the TR is within a TR range within which anonymity is required, the MME sending the TAC of the UE to the TCE; determining the MDT measurements are not to be reported anonymously when the TR is within a TR range within which anonymity is not required, the MME sending the IMSI or the IMEISV of the UE to the TCE.

Preferably, the MDT data anonymity configuration comprises: a TR which is obtained from a message sent by an EM;

the method may further comprises: obtaining, by the MME, a TR range within which anonymity is required, a TR range within which anonymity is not required and a TR range within which both two types of identities are to be reported from a message, wherein the TR ranges are defined by an EM;

a functioning rule of the MDT data anonymity configuration comprises: determining the MDT measurements are to be reported anonymously at the TAC level when the TR is within the TR range within which anonymity is required, the MME sending the TAC of the UE to the TCE; determining the MDT measurements are not to be reported anonymously when the TR is within a TR range within which anonymity is not required, the MME sending the IMSI or the IMEISV of the UE to the TCE; determining the two types of identities are to be reported when the TR is within the TR range within which both two types of identities are to be reported, the MME sending the TAC and the IMSI of the UE or the TAC and the IMEISV of the UE to the TCE.

Advantageous Effects of Invention

In view of the foregoing technical schemes, according to the method of anonymously reporting MDT measurements provided by the present invention, the MME obtains MDT data anonymity configuration, sends a UE identification to the TCE according to the MDT data anonymity configuration, thus the MME is able to send different identifications of the UE to the TCE according to different requirements for anonymity, and therefore anonymous report of MDT measurements is implemented.

BRIEF DESCRIPTION OF DRAWINGS

FIG. 3 is a flowchart illustrating a signaling process of initiating a management-based MDT according to the prior art.

FIG. 4 is a flowchart illustrating a signaling process of anonymously reporting MDT measurements according to embodiment one of the present invention.

FIG. 5 is a flowchart illustrating a signaling process of anonymously reporting MDT measurements according to embodiment two of the present invention.

BEST MODE FOR CARRYING OUT THE INVENTION

Figure 1:
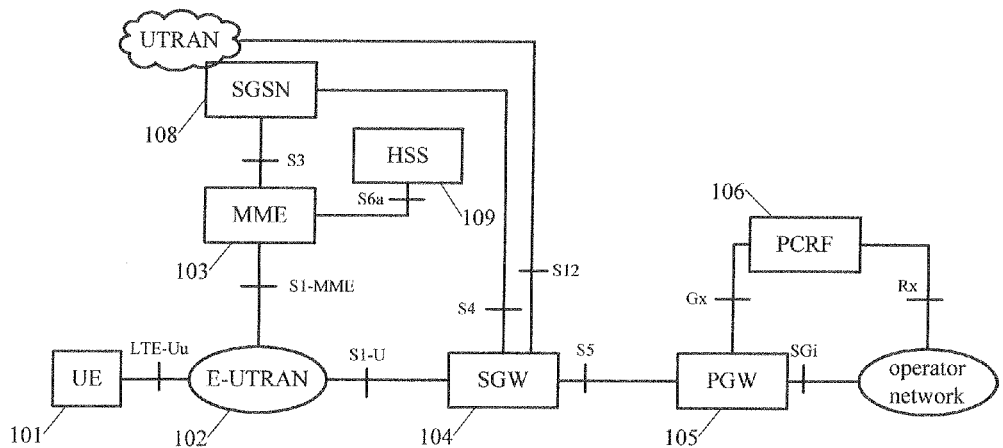
FIG. 1 is a schematic illustrating a system structure of SAE according to the prior art.
Figure 2:
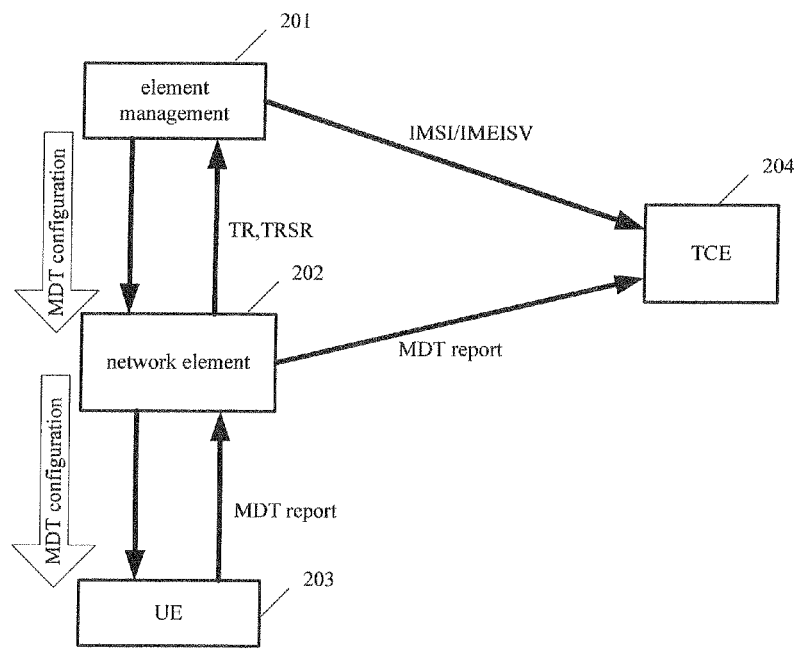
FIG. 2 is a schematic illustrating a structure of a management-based MDT according to the prior art.

The present invention is hereinafter further described in detail with reference to the accompanying drawings as well as embodiments so as to make the objective, technical solution and merits thereof more apparent.

Embodiments of the present invention provide a method of anonymously reporting MDT measurements. According to the method, an MME firstly obtains MDT data anonymity configuration information, and sends an identification of a UE to a TCE according to the MDT data anonymity configurations.

The MDT data anonymity configuration information may be obtained from an eNB or an EM.

The MDT anonymity configuration information is for indicating whether MDT measurements are to be reported anonymously at the TAC level; if the anonymity configuration indicates the MDT measurements are to be reported anonymously at the TAC level, the MME sends the TAC of the UE as the identification of the UE to the TCE; otherwise, the MME sends the IMSI/IMEISV of the UE as the identification of the UE to the TCE.

Seven examples are hereinafter described to further illustrate the present invention.

Example One

Example one illustrates a method of an eNB reporting anonymity indication information to an MME, and the method implements anonymously reporting MDT measurements. The process of this example is based on the process shown in FIG. 3 with modifications to procedures in blocks 306 and 307 of FIG. 3. The new procedures of the blocks 306 and 307 are described in this example, and the other blocks are the same with corresponding blocks in FIG. 3 which have been described in the above background part, thus are not described further herein. FIG. 4 is a flowchart illustrating a signaling process of anonymously reporting MDT measurements according to embodiment one of the present invention. As shown in FIG. 4, the method may include the following procedures.

In block 401, an eNB sends a cell traffic trace message to an MME. The cell traffic trace message may include an anonymity indicator which is set by the eNB based on a work mode and MDT data anonymity information in the MDT configuration information sent by the EM in block 302.

The work mode may include: Immediate MDT only, Logged MDT only, Trace only and Immediate MDT and Trace. The MDT data anonymity information may be configured to be any of two anonymity levels, i.e., TAC-level anonymity and full anonymity.

Based on the work mode and the MDT data anonymity information, the eNB may configure the anonymity indicator. The anonymity indicator may be configured in the following two manners.

Manner one, whether anonymity is applied to MDT data can be determined based on whether the cell traffic trace message includes the anonymity indicator. The cell traffic trace message includes the anonymity indicator indicates anonymity is applied to the MDT data, and the MME sends the TAC to the TCE; the cell traffic trace message does not include the anonymity indicator indicates anonymity is not configured, and the MME sends the IMSI/IMEISV to the TCE. If the MDT data anonymity is full anonymity, the eNB is not to send the cell traffic trace message to the MME.

Manner two, whether TAC-level anonymity is configured for MDT data is indicated by different values of the anonymity indicator (anonymity, no anonymity).

After receiving the cell traffic trace message, the MME determines which identification is to be sent by the TCE based on the anonymity indicator in the cell traffic trace message. If anonymity is configured, the MME obtains the TAC from the IMEI, and sends the TAC to the TCE. If anonymity is not configured, the MME sends the IMSI/IMEISV to the TCE. The detailed manner of configuring the anonymity indicator is as shown in Table 1.

When the work mode is Immediate MDT and Trace, and the MDT data anonymity is configured to be TAC-level anonymity, the situation is complicated because Trace requires the MME to send IMSI/IMEISV to the TCE while MDT requires the MME to send the TAC to the TCE. Therefore the eNB needs to make a decision as to whether Trace has priority or MDT has priority. In order to make the eNB make a sole decision for the same situations, a judging rule can be pre-defined for the eNB, e.g. if it is pre-defined that requirements of Trace should be firstly satisfied, the eNB instructs the MME to send the IMSI/IMEISV to the TCE via the anonymity indicator; if it is pre-defined that requirements of MDT should be firstly satisfied, the eNB instructs the MME to send the TAC to the TCE via the anonymity indicator. The following Table 1 takes Trace enjoys the priority as an example, and the eNB acts as follows.

Corresponding to the Above Method 1:

When the work mode is Immediate MDT only or Logged MDT only, and the MDT data anonymity is set to be TAC-level anonymity, the MME needs to send the TAC to the TCE. In this case, the eNB loads an anonymity indicator into the cell traffic trace message to be sent to the MME to instruct the MME to send the TAC to the TCE.

When the MDT data anonymity is set to be full anonymity, the MME does not have to send any identification of the UE to the TCE, thus the eNB does not send any cell traffic trace message to the MME.

For other situations, there is no need to perform anonymous report, and the cell traffic trace message sent by the eNB to the MME does not include any anonymity indicator, so that the MME sends the IMSI/IMEISV to the TCE.

Corresponding to the Above Method 2:

When the work mode is Immediate MDT only or Logged MDT only, and the MDT data anonymity is set to be TAC-level anonymity, the anonymity indicator in the cell traffic trace message to be sent to the MME by the eNB is set to be "anonymity", and the MME needs to send the TAC to the TCE.

If the MDT data anonymity is full anonymity, the eNB sends no cell traffic trace message to the MME.

In other situations, the anonymity indicator in the cell traffic trace message to be sent by the MME by the eNB is set to be "no anonymity", and the MME sends the IMSI/IMEISV to the TCE.

TABLE 1

| Work mode | MDT data anonymity information | Method 1 is adopted by the eNB for setting the anonymity indicator | Method 2 is adopted by the eNB for setting the anonymity indicator |
| --- | --- | --- | --- |
| Any mode | MDT data anonymity is set as full anonymity | No anonymity indicator, the eNB sends no cell traffic trace message to the MME | No anonymity indicator, the eNB sends no cell traffic trace message to the MME |
| Any mode | No MDT data anonymity is set | Cell traffic trace message includes no anonymity indicator | Anonymity indicator is set to be "no anonymity" |
| Trace only | Since it's Trace, no MDT data anonymity is set | Cell traffic trace message includes no anonymity indicator | Anonymity indicator is set to be "no anonymity" |
| Immediate MDT only | MDT data anonymity is set to be TAC-level anonymity | Cell traffic trace message includes an anonymity indicator | Anonymity indicator is set to be "anonymity" |
| Logged MDT only | MDT data anonymity is set to be TAC-level anonymity | Cell traffic trace message includes an anonymity indicator | Anonymity indicator is set to be "anonymity" |
| Immediate MDT and Trace | MDT data anonymity is set to be TAC-level anonymity | Cell traffic trace message includes no anonymity indicator | Anonymity indicator is set to be "no anonymity" |

If it is pre-defined that anonymity requirements of MDT is firstly satisfied, the eNB acts as the follows.

Corresponding to the Above Method 1:

When the work mode is in connection with MDT, e.g., Immediate MDT only or Logged MDT only or Immediate MDT only and Trace, and the MDT data anonymity is set to be TAC-level anonymity, the cell traffic trace message to be sent to the MME by the eNB includes an anonymity indicator, and the MME needs to send the TAC to the TCE.

When the MDT data anonymity is set to be full anonymity, the MME does not have to send any identification of the UE to the TCE, thus the eNB does not send any cell traffic trace message to the MME.

For other situations, i.e. the work mode is Trace, there is no need to perform anonymous report, and the cell traffic trace message sent by the eNB to the MME does not include any anonymity indicator, so that the MME sends the IMSI/IMEISV to the TCE.

Corresponding to the Above Method 2:

When the work mode is in connection with MDT, e.g., Immediate MDT only or Logged MDT only or Immediate MDT only and Trace, and the MDT data anonymity is set to be TAC-level anonymity, the anonymity indicator in the cell traffic trace message to be sent to the MME by the eNB is set to be "anonymity", and the MME sends the TAC to the TCE.

If the MDT data anonymity is full anonymity, the eNB sends no cell traffic trace message to the MME.

In other situations, the anonymity indicator in the cell traffic trace message to be sent by the MME by the eNB is set to be "no anonymity", and the MME sends the IMSI/IMEISV to the TCE.

In block 402, the MME receives the cell traffic trace message from the eNB which includes the TR, the TRSR, the IP address of the TCE and the anonymity indicator. Based on the different configuration of the anonymity indicator, the MME may act as follows. For example:

if the eNB sets the anonymity indicator according to the method 1, after receiving the cell traffic trace message, if the message includes no anonymity indicator, the MME sends the IMSI/IMEISV to the TCE;

if the message includes an anonymity indicator, the MME obtains the TAC from the IMEI and sends the TAC to the TCE;

if the eNB sets the anonymity indicator according to the method 2, after receiving the cell traffic trace message, if the anonymity indicator is set to be "no anonymity", the MME sends the IMSI/IMEISV to the TCE;

if the anonymity indicator is set to be "anonymity", the MME obtains the TAC from the IMEI and sends the TAC to the TCE.

In the above block 401, when the work mode is Immediate MDT and Trace, and the MDT data anonymity is set to be TAC-level anonymity, a pre-defined rule is adopted by the eNB for determine whether to firstly satisfy the anonymity requirements of Trace or MDT. Supposing both the requirements of Trace and MDT need to be satisfied, the eNB may instructs the MME to send both the TAC and the INSI/IMEISV to the TCE via the anonymity indicator. Specifically, the following method may be adopted.

When the work mode is Immediate MDT only or Logged MDT only, and the MDT data anonymity is set to be TAC-level anonymity, the anonymity indicator in the cell traffic trace message to be sent to the MME by the eNB is set to be "anonymity", and the MME needs to send the TAC to the TCE.

When the work mode is Immediate MDT and Trace, and the MDT data anonymity is set to be TAC-level anonymity, the anonymity indicator in the cell traffic trace message to be sent to the MME by the eNB is set to be "both two types of identifications are needed", and the MME sends the TAC and the IMSI/IMEISV to the TCE.

When the MDT data anonymity is full anonymity, the eNB sends no cell traffic trace message to the MME.

In other situations, the anonymity indicator in the cell traffic trace message to be sent by the MME by the eNB is set to be "no anonymity", and the MME sends the IMSI/IMEISV to the TCE. Or, in other situations, there is no need to perform anonymous report, and the cell traffic trace message sent by the eNB to the MME does not include any anonymity indicator, so that the MME sends the IMSI/IMEISV to the TCE.

In block 402, the MME receives the cell traffic trace message from the eNB which includes the TR, the TRSR, the IP address of the TCE and the anonymity indicator. Based on the different configuration of the anonymity indicator, the MME may act as follows.

If the anonymity indicator in the message is set to be "anonymity", the MME obtains the TAC from the IMEI and sends the TAC to the TCE.

If the anonymity indicator in the message is set to be "both two identifications are needed", the MME sends the TAC and the IMSI/IMEISV to the TCE.

If the anonymity indicator in the message is set to be "no anonymity" or the message includes no anonymity indicator, the MME sends the IMSI/IMEISV to the TCE.

Example Two

Example two illustrates a method of an eNB reporting an MDT type to an MME, and the method implements anonymously reporting MDT measurements. The process of this example is based on the process shown in FIG. 3 with modifications to procedures in blocks 306 and 307 of FIG. 3. The new procedures of the blocks 306 and 307 are described in this example, and the other blocks are the same with corresponding blocks in FIG. 3 which have been described in the above background part, thus are not described further herein. FIG. 5 is a flowchart illustrating a signaling process of anonymously reporting MDT measurements according to embodiment two of the present invention. As shown in FIG. 5, the method may include the following procedures.

In block 501, an eNB sends a cell traffic trace message to an MME. Three types of the work mode in the MDT configuration information sent by the EM in block 302 are in connection with MDT, and those types of work mode are referred to as MDT type. The work mode configured by the EM may be any of: Immediate MDT only, Logged MDT only, Trace only and Immediate MDT and Trace. Among the above work modes, three of them, i.e., the Immediate MDT only, the Logged MDT only and the Immediate MDT and Trace belong to MDT type. When the MDT data anonymity is set to be TAC-level anonymity, the eNB loads the MDT type into the cell traffic trace message to be sent to the MME. If the MDT data anonymity is set to be full anonymity, the eNB sends no cell traffic trace message.

As shown in Table 2, the eNB may act as follows.

When the MDT data anonymity is set to be TAC-level anonymity, the eNB sends the MDT type to the MME.

When the MDT data anonymity is full anonymity, the eNB sends no cell traffic trace message to the MME.

TABLE 2

| Work mode | MDT data anonymity information | The MDT type set by the eNB in this block |
|---|---|---|
| Any type | MDT data anonymity is set as full anonymity | The eNB sends no cell traffic trace to the MME |
| Any type | No MDT data anonymity is set | Cell traffic trace message includes no MDT type |
| Trace only | Since it's Trace, no MDT data anonymity is set | Cell traffic trace message includes no MDT type |
| Immediate MDT only | MDT data anonymity is set to be TAC-level anonymity | Cell traffic trace message includes an MDT type which is set as "Immediate MDT only" |
| Logged MDT only | MDT data anonymity is set to be TAC-level anonymity | Cell traffic trace message includes an MDT type which is set as "Logged MDT only" |
| Immediate MDT and Trace | MDT data anonymity is set to be TAC-level anonymity | Cell traffic trace message includes an MDT type which is set as "Immediate MDT and Trace" |

In block 502, the MME receives the cell traffic trace message from the eNB which includes the TR, the TRSR, the IP address of the TCE and the MDT type. The MME may perform the following actions based on the MDT type:

if the message includes no MDT type, the MME sends the IMSI/IMEISV to the TCE;

if the MDT type is set as "Immediate MDT only" or "Logged MDT only", the MME obtains the TAC from the IMEI and sends the TAC to the TCE;

if the MDT type is set as "Immediate MDT and Trace", the Trace requires the MME to send the IMSI/IMEISV to the TCE while the MDT requires the MME to send the TAC to the TCE, thus the MME needs to decide which identification is to be sent to the TCE. The identification of the UE to be sent by the MME may be specifically defined. For example, it may be specified that the MME should send the IMSI/IMEISV to the TCE, or that the MME should send the TAC to the TCE, or that both identifications should be sent. Based on the pre-defined rule, the MME sends the IMSI/IMEISV, or the TAC, or the TAC and the IMSI/IMEISV to the TCE.

Example Three

Figure 6:
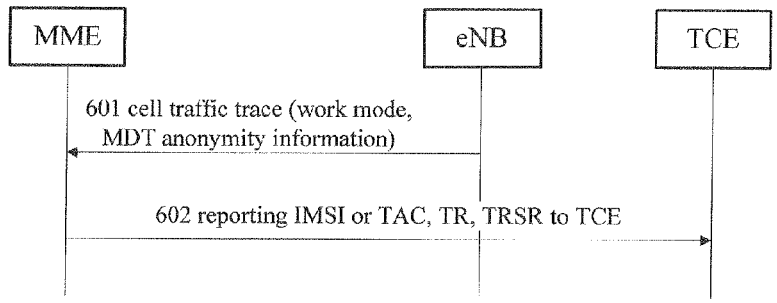
FIG. 6 is a flowchart illustrating a signaling process of anonymously reporting MDT measurements according to embodiment three of the present invention.

Example three illustrates a method of an eNB reporting a work mode or an MDT type and an anonymity indicator to an MME, and the method implements anonymously reporting MDT measurements. The process of this example is based on the process shown in FIG. 3 with modifications to procedures in blocks 306 and 307 of FIG. 3. The new procedures of the blocks 306 and 307 are described in this example, and the other blocks are the same with corresponding blocks in FIG. 3 which have been described in the above background part, thus are not described further herein. FIG. 6 is a flowchart illustrating a signaling process of anonymously reporting MDT measurements according to embodiment three of the present invention. As shown in FIG. 6, the method may include the following procedures.

In block 601, an eNB sends a cell traffic trace message to an MME. The eNB obtains the MDT configuration information which includes the work mode and the MDT data anonymity information sent by the EM in block 302. The eNB sends the work mode and the MDT anonymity information to the MME in a cell traffic trace message, or sends the MDT type and the MDT anonymity information to the MME in a cell traffic trace message.

The MDT type is those work modes in connection with MDT, i.e., the MDT Immediate MDT only, Logged MDT only and Immediate MDT and Trace. The MDT anonymity information is set according to the MDT data anonymity information set in block 302. When the MDT data anonymity is set to be TAC-level anonymity, the message in block 601 includes the MDT anonymity information. When the MDT configuration in block 302 sets no MDT data anonymity information, the message in block 601 includes no MDT anonymity information. Alternatively, the MDT anonymity information in block 601 may be set as "Yes" indicating the MDT data anonymity is TAC-level anonymity, or "No" indicating no MDT data anonymity is not set in the MDT configuration information.

In block 602, the MME receives the cell traffic trace message sent by the eNB which includes the TR, the TRSR, the IP address of the TCE, the work mode and the MDT anonymity information, or includes the TR, the TRSR, the IP address of the TCE, the MDT type and the MDT anonymity information.

When the message includes the TR, the TRSR, the IP address of the TCE, the work mode and the MDT anonymity information, according to the work mode and the MDT anonymity information, the MME may act as follows:

if the message includes no MDT anonymity information or the work mode is "Trace only", the MME sends the IMSI/IMEISV to the TCE;

if the work mode is "Immediate MDT only" or "Logged MDT only" and the message includes the MDT anonymity, the MME obtains the TAC from the IMEI and sends the TAC to the TCE;

if the work mode is "Immediate MDT and Trace" and the message includes the MDT anonymity information, similar to that in the above examples, it is useful to pre-define which identification of the UE should be sent by the MME to the TCE; if requirements of the Trace should be firstly satisfied, the MME sends the IMSI/IMEISV to the TCE; if the requirements of the MDT should be firstly satisfied, the MME sends the TAC to the TCE; if requirements of both the Trace and MDT should be satisfied, both types of identifications are to be sent, and the MME obtains the TAC from the IMEI and sends the TAC and the IMSI/IMEISV to the TCE.

Or, if MDT anonymity information in the message is set as "No" or the work mode is "Trace only", the MME sends the IMSI/IMEISV to the TCE;

if the work mode is "Immediate MDT only" or "Logged MDT only" and the MDT anonymity in the message is set as "Yes", the MME obtains the TAC from the IMEI and sends the TAC to the TCE;

if the work mode is "Immediate MDT and Trace" and the MDT anonymity information in the message is set as "Yes", similar to that in the above examples, it is useful to pre-define which identification of the UE should be sent by the MME to the TCE; if requirements of the Trace should be firstly satisfied, the MME sends the IMSI/IMEISV to the TCE; if the requirements of the MDT should be firstly satisfied, the MME sends the TAC to the TCE; if requirements of both the Trace and MDT should be satisfied, both types of identifications are to be sent, and the MME obtains the TAC from the IMEI and sends the TAC and the IMSI/IMEISV to the TCE.

Or,

When the message includes the TR, the TRSR, the IP address of the TCE, the MDT type and the MDT anonymity information, based on the MDT type and the MDT anonymity information, the MME may act as follows:

if the message includes no MDT anonymity information, the MME sends the IMSI/IMEISV to the TCE;

if the MDT type is "Immediate MDT only" or "Logged MDT only" and the message includes the MDT anonymity, the MME obtains the TAC from the IMEI and sends the TAC to the TCE;

if the MDT type is "Immediate MDT and Trace" and the message includes the MDT anonymity information, similar to that in the above examples, it is useful to pre-define which identification of the UE should be sent by the MME to the TCE; if requirements of the Trace should be firstly satisfied, the MME sends the IMSI/IMEISV to the TCE; if the requirements of the MDT should be firstly satisfied, the MME sends the TAC to the TCE; if requirements of both the Trace and MDT should be satisfied, both types of identifications are to be sent, and the MME obtains the TAC from the IMEI and sends the TAC and the IMSI/IMEISV to the TCE.

Or, if the MDT anonymity information in the message is set to be "No", the MME sends the IMSI/IMEISV to the TCE;

if the MDT type is "Immediate MDT only" or "Logged MDT only" and the MDT anonymity in the message is set as "Yes", the MME obtains the TAC from the IMEI and sends the TAC to the TCE;

if the MDT type is "Immediate MDT and Trace" and the MDT anonymity information in the message is set as "Yes", similar to that in the above examples, it is useful to pre-define which identification of the UE should be sent by the MME to the TCE; if requirements of the Trace should be firstly satisfied, the MME sends the IMSI/IMEISV to the TCE; if the requirements of the MDT should be firstly satisfied, the MME sends the TAC to the TCE; if requirements of both the Trace and MDT should be satisfied, both types of identifications are to be sent, and the MME obtains the TAC from the IMEI and sends the TAC and the IMSI/IMEISV to the TCE.

Example Four

Figure 7:
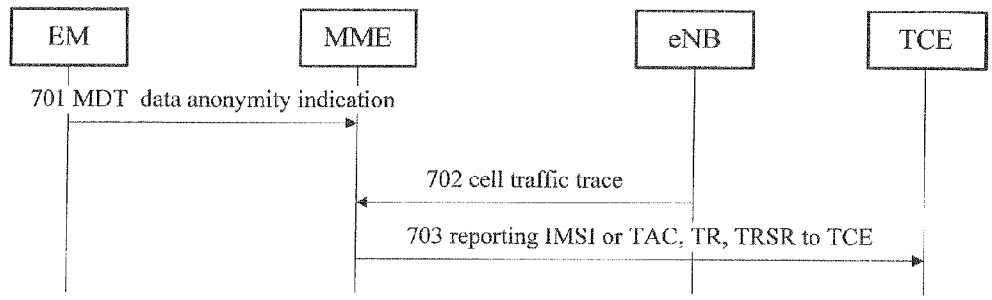
FIG. 7 is a flowchart illustrating a signaling process of anonymously reporting MDT measurements according to embodiment four of the present invention.

Example four illustrates a method of an EM reporting an MDT anonymity indicator to an MME, and the method implements anonymously reporting MDT measurements. The process of this example is based on the process shown in FIG. 3 with modifications to procedures in block 307 of FIG. 3, and adds a new procedure between blocks 302 and 307. The other blocks are the same with conventional scheme and have been described in FIG. 3, thus are not described further herein. FIG. 7 is a flowchart illustrating a signaling process of anonymously reporting MDT measurements according to embodiment four of the present invention. As shown in FIG. 7, the method may include the following procedures.

In block 701, an EM sends an MDT data anonymity indication message which includes a TR and an anonymity indicator to an MME.

The method of setting the anonymity indicator is the same with that described in Table 1 and block 401. This procedure may be performed after the procedure in block 302 of FIG. 3 is performed and before the procedure in block 307 is performed. The EM may adopt two methods for conveying the data anonymity information.

Method 1 conveys the data anonymity information by whether or not to send the message. If the MDT data anonymity indication message is sent, it means the MDT data anonymity is TAC-level anonymity, and the MME is to send the TAC to the TCE. If the MDT data anonymity indication message is not sent, the MME sends the IMSI/IMEISV to the TCE. The message may at least include the TR.

Method 2 conveys the data anonymity information via the anonymity indicator. When the anonymity indicator is set to be "anonymity", the MME sends the TAC to the TCE; when the anonymity indicator is set to be "no anonymity", the MME sends the IMSI/IMEISV to the TCE.

In block 702, after receiving an MDT measurement report, the eNB sends a cell traffic trace message which includes the TR, the TRSR and the IP address of the TCE to the MME.

In block 703, the MME receives the cell traffic trace message from the eNB which includes the TR, the TRSR, and the IP address of the TCE. Based on the MDT data anonymity set in block 701, the MME may act as follows.

Corresponding to the Above Method 1:

if the MME does not receive the message of block 701, the MME sends the IMSI/IMEISV to the TCE;

if the MME receives the message of block 701, the MME obtains the TAC from the IMEI and sends the TAC to the TCE.

Corresponding to the above method 2, when receiving the MDT data anonymity indicator message sent in block 701, if the anonymity indicator is set to be "no anonymity", the MME sends the IMSI/IMEISV to the TCE;

If the anonymity indicator is set to be "anonymity", the MME obtains the TAC from the IMEI and sends the TAC to the TCE.

Example Five

Figure 8:
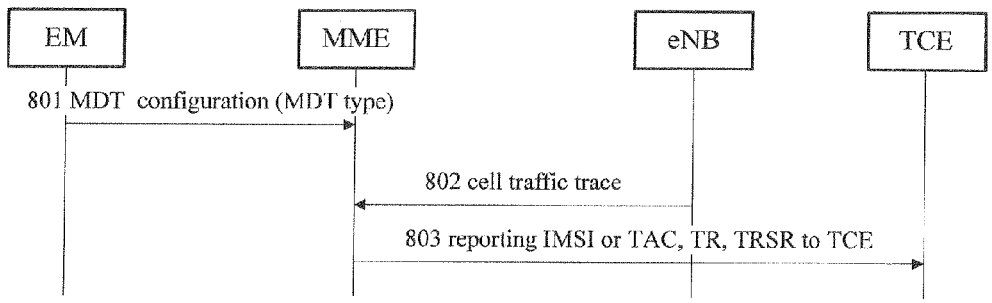
FIG. 8 is a flowchart illustrating a signaling process of anonymously reporting MDT measurements according to embodiment five of the present invention.

Example five illustrates a method of an EM reporting an MDT type to an MME, and the method implements anonymously reporting MDT measurements. The process of this example is based on the process shown in FIG. 3 with modifications to procedures in block 307 of FIG. 3, and adds a new procedure between blocks 302 and 307. The other blocks are the same with conventional scheme and have been described in FIG. 3, thus are not described further herein. FIG. 8 is a flowchart illustrating a signaling process of anonymously reporting MDT measurements according to embodiment five of the present invention. As shown in FIG. 8, the method may include the following procedures.

In block 801, an EM sends an MDT configuration message which includes a TR and an MDT type to an MME.

The method of setting the anonymity indicator is the same with that described in Table 2 of block 501. The EM may perform the same actions with those described in block 701. This procedure may be performed after the block 302 in FIG. 3 is performed and before block 307 is performed.

In block 802, after receiving an MDT measurement report, the eNB sends a cell traffic trace message which includes the TR, the TRSR and the IP address of the TCE to the MME.

In block 803, the MME receives the cell traffic trace message from the eNB which includes the TR, the TRSR, and the IP address of the TCE. Based on the MDT type set in block 801, the MME may act as follows:

if the MME does not receive the message sent in block 801, the MME sends the IMSI/IMEISV to the TCE;

if the MDT type in the message sent in block 801 is set as "Immediate MDT only" or "Logged MDT only", the MME obtains the TAC from the IMEI and sends the TAC to the TCE;

if the MDT type in the message sent in block 801 is set to be "Immediate MDT and Trace", according to a pre-defined rule, the MME sends the IMSI/IMEISV to the TCE, or sends the TAC to the TCE, or sends both identifications, i.e., the MME obtains the TAC from the IMEI, and sends the TAC and the IMSI/IMEISV to the TCE.

Example Six

Figure 9:
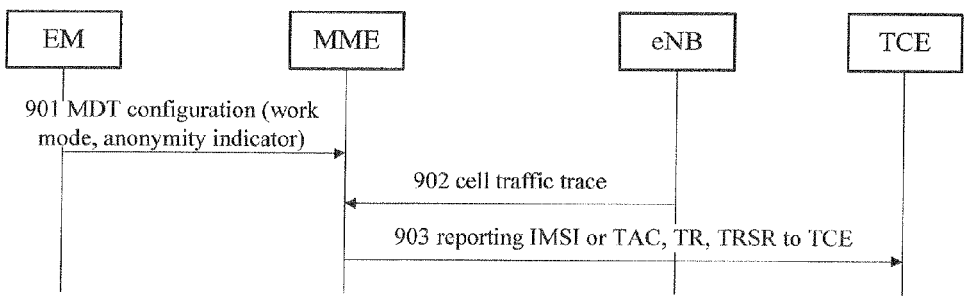
FIG. 9 is a flowchart illustrating a signaling process of anonymously reporting MDT measurements according to embodiment six of the present invention.

Example six illustrates a method of an EM reporting an MDT type and an MDT anonymity indicator to an MME, and the method implements anonymously reporting MDT measurements. The process of this example is based on the process shown in FIG. 3 with modifications to procedures in block 307 of FIG. 3, and adds a new procedure between blocks 302 and 307. The other blocks are the same with conventional scheme and have been described in FIG. 3, thus are not described further herein. FIG. 9 is a flowchart illustrating a signaling process of anonymously reporting MDT measurements according to embodiment six of the present invention. As shown in FIG. 9, the method may include the following procedures.

In block 901, an EM sends an MDT configuration message which includes a TR, an MDT type and an MDT anonymity indicator to an MME.

The method of setting the MDT type is the same with that described in block 601. When the MDT data anonymity is set to be TAC-level anonymity, the message sent in block 901 includes the MDT anonymity indicator. If the MDT data anonymity is not configured or is configured to be full anonymity, the message sent in block 901 does not include the MDT anonymity indicator. This procedure may be performed after the block 302 in FIG. 3 is performed and before block 307 is performed.

In block 902, after receiving an MDT measurement report, the eNB sends a cell traffic trace message which includes the TR, the TRSR and the IP address of the TCE to the MME.

In block 903, after receiving the cell traffic trace message sent by the eNB, based on the MDT type and the MDT anonymity indicator, the MME may act as follows:

if the message includes no MDT anonymity indicator, the MME sends the IMSI/IMEISV to the TCE;

if the MDT type is "Immediate MDT only" or "Logged MDT only" and the message includes the MDT anonymity indicator, the MME obtains the TAC from the IMEI and sends the TAC to the TCE;

if the MDT type is "Immediate MDT and Trace" and the message includes the MDT anonymity indicator, similar to that in the above examples, it is useful to pre-define which identification of the UE should be sent by the MME to the TCE; if requirements of the Trace should be firstly satisfied, the MME sends the IMSI/IMEISV to the TCE; if the requirements of the MDT should be firstly satisfied, the MME sends the TAC to the TCE; if requirements of both the Trace and MDT should be satisfied, both types of identifications are to be sent, and the MME obtains the TAC from the IMEI and sends the TAC and the IMSI/IMEISV to the TCE.

Example Seven

An embodiment of the present invention provides a method which indicates whether the MME performs anonymous reporting by defining different TR ranges. Since the TR is generated by the EM, the EM may configure different TR ranges. The TR may allocate a TR within one TR range for an MDT type requiring anonymity, and allocate another TR within another TR range for a work mode requiring no anonymity. Alternatively, the range of TR may be divided into three TR ranges, one for a work mode requiring anonymous reporting, one for a work mode not requiring anonymous reporting, and one for a work mode requiring reporting both identifications of the UE. This example takes dividing the TR into two TR ranges as an example. When the TR is divided into three or more TR ranges, the procedures can be obtained by performing simple replacements, and are not described further herein. Since it is the MME that reports the identification of the UE, the EM needs to inform the MME of the information of the ranges. The method may include the following procedures.

In block 1, an EM divides TR value range into different ranges including: a TR range requiring anonymity and a TR range not requiring anonymity, and allocates TR from different TR ranges for different work modes for indicating whether the MME is to perform anonymous reporting. The EM sends a Trace activation request which includes the TR, the work mode and MDT data anonymity information to an eNB.

The EM divides the TR value range into two ranges. A TR in one of the two ranges indicates anonymity is required, and this range is referred to as range A; while a TR in the other of the two ranges indicates anonymity is not required, and this range is referred to as range B.

If the work mode is Immediate MDT or Logged MDT, the EM selects a value as the TR to be sent in the Trace activation request from the TR range requiring anonymity, i.e., range A.

If the work mode is Trace, the EM selects a value as the TR to be sent in the Trace activation request from the TR range not requiring anonymity, i.e., range B.

If the work mode is Immediate MDT and Trace, a pre-defined rule is adopted for the judgment. If it is pre-defined that requirements of the Trace should be satisfied, the EM selects a value from the range B as the TR to be sent in the Trace activation request; if it is pre-defined that requirements of the MDT should be satisfied, the EM selects a value from the range A as the TR to be sent in the Trace activation request.

In block 2, the EM informs the MME of the TR ranges.

In this block, the EM may send a message to the MME for informing the MME of the TR ranges. The message may include the TR range requiring anonymity, e.g., include a head TR and a tail TR of the TR range, and TRs within this range are deemed by the MME to be requiring anonymous reporting. Or, the message may include the TR range not requiring anonymity. Or, the TR range requiring anonymity and the TR range not requiring anonymity are both included in the message. After receiving the cell traffic trace message sent by the eNB, based on the TR in the cell traffic trace message and the TR range received in block 2, the MME sends the TAC to the TCE if the TR in the cell traffic trace message is within the TR range requiring anonymity, or sends the IMSI/IMEISV to the TCE if the TR in the cell traffic trace message is not within the TR range requiring anonymity.

It should be noted that according to the prior art, if the MDT data anonymity information is configured to be full anonymity, the eNB does not send the cell traffic trace message to the MME, and the MME does not send any identification of the UE to the TCE. And embodiments of the present invention conform to this rule. Therefore, although in the above embodiments of the present invention, the eNB all sends a cell traffic trace message to the MME, but it does not mean the eNB always sends the message. It merely explains the method of informing the MME of which identification of the UE is to be sent to the TCE when the eNB needs to send the cell traffic trace message.

In view of the foregoing examples, according to the method of anonymously reporting MDT measurements provided by the present invention, the MME obtains MDT data anonymity configuration, sends a UE identification to the TCE according to the MDT data anonymity configuration, thus the MME is able to send different identifications of the UE to the TCE according to different requirements for anonymity, and therefore anonymous report of MDT measurements is implemented.

On the other hand, as not illustrated in any Figs, it will be understood by those of ordinary skill in the art that each of the MME, and the TCP may includes a receiver, a controller, and a transmitter. It will be assumed that the receiver, the controller, and the transmitter included in each of the MME and the TCE may be implemented as separate units, however it is possible that the receiver, the controller, and the transmitter included in each of the MME, and the TCE may be incorporated into a single unit.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for reporting minimization of drive test (MDT) measurements by a base station, the method comprising:
   determining whether anonymization of MDT data is based on a type allocation code (TAC);
   generating a cell traffic trace message based on the determination; and
   transmitting, to a mobility management entity (MME), the generated cell traffic trace message,
   wherein the TAC of a terminal is transmitted by the MME to a trace collection entity (TCE) if the anonymization of the MDT data is based on the TAC, and
   wherein the cell traffic trace message includes an S1 AP ID identifying the terminal in the base station.

2. The method of claim 1, wherein an international mobile subscriber identification (IMSI) or an international mobile equipment identity and software version (IMEISV) of the terminal is transmitted by the MME to the TCE if the anonymization of the MDT data is not based on the TAC.

3. The method of claim 1, wherein the cell traffic trace message further includes information indicating a logged MDT or an immediate MDT.

4. The method of claim 1, wherein the cell traffic trace message further includes at least one of an S1 AP ID identifying the terminal in the MME, an internet protocol (IP) address of the TCE, a trace reference (TR), or a trace recording session reference (TRSR).

5. A base station for reporting minimization of drive test (MDT) measurements, the base station comprising:
   a controller configured to:
      determine whether anonymization of MDT data is based on a type allocation code (TAC),
      generate a cell traffic trace message based on the determination, and
      transmit, to a mobility management entity (MME), the generated cell traffic trace message; and
   a transceiver configured to transmit messages,
   wherein the TAC of a terminal is transmitted by the MME to a trace collection entity (TCE) if the anonymization of the MDT data is based on the TAC, and
   wherein the cell traffic trace message includes an S1 AP ID identifying the terminal in the base station.

6. The base station of claim 5, wherein an international mobile subscriber identification (IMSI) or an international mobile equipment identity and software version (IMEISV) of the terminal is transmitted by the MME to the TCE if the anonymization of the MDT data is not based on the TAC.

7. The base station of claim 5, wherein the cell traffic trace message further includes information indicating a logged MDT or an immediate MDT.

8. The base station of claim 5, wherein the cell traffic trace message further includes at least one of an S1 AP ID identifying the terminal in the MME, an internet protocol (IP) address of the TCE, a trace reference (TR), or a trace recording session reference (TRSR).

* * * * *